United States Patent
Beezer et al.

(10) Patent No.: US 6,597,314 B1
(45) Date of Patent: Jul. 22, 2003

(54) METHOD AND APPARATUS FOR PROVIDING HELP AND SETTINGS CONTROL TO USERS OF AN ELECTRONIC BOOK

(75) Inventors: John L Beezer, Redmond, WA (US); Darryl E Rubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/456,952

(22) Filed: Dec. 7, 1999

(51) Int. Cl.[7] .............................................. G09G 5/00
(52) U.S. Cl. ................................................... 342/812
(58) Field of Search ........................ 345/708–711, 707, 345/712–713, 853–855, 776, 856–862, 749, 811, 818, 828, 804, 812, 813; 707/5, 10, 12

(56) References Cited

U.S. PATENT DOCUMENTS

| 5,687,331 A | * | 11/1997 | Volk et al. .................. 345/804 |
| 5,933,140 A | * | 8/1999 | Strahorn et al. ............. 345/749 |
| 5,950,214 A | * | 9/1999 | Rivette et al. ............... 707/512 |
| 6,011,537 A | * | 1/2000 | Slotznick ..................... 345/115 |
| 6,012,055 A | * | 1/2000 | Campbell et al. .............. 707/5 |
| 6,091,930 A | * | 7/2000 | Mortimer et al. ........... 434/362 |
| 6,421,065 B1 | * | 7/2002 | Walden et al. ............... 345/712 |

\* cited by examiner

*Primary Examiner*—Steven Sax
(74) *Attorney, Agent, or Firm*—Banner & Witcoff, Ltd.

(57) ABSTRACT

A method and apparatus for providing user access to help and settings control in a system for viewing electronic books includes single document integrating help features and settings controls may be accessed in a single-window or single page viewing environment. The help and settings document may be accessed from a number of different contexts, including a library page or from within a book. "Smart" navigational features are provided for predicting a part, section or chapter of the help and settings document that is sought by a user based on navigational history and user profiles. Feedback as to the accuracy of predictions made by the "smart" navigation is also provided.

14 Claims, 8 Drawing Sheets

METHOD AND APPARATUS FOR PROVIDING HELP AND SETTINGS CONTROL TO USERS OF AN ELECTRONIC BOOK

TECHNICAL FIELD

The invention relates generally to methods and apparatus for displaying electronic documents. More particularly, the invention relates to methods and apparatus for providing user access to help and settings features in a system for viewing electronic documents.

BACKGROUND OF THE INVENTION

As computers have become smaller and more powerful, there have been recent efforts to provide portable, hand-held computers for rendering electronic content in a manner that is similar or identical to the way content is presented in a printed book. Thus, much effort has focused on providing a user interface for computers which fosters an immersive reading experience, or the sensation of being "lost" in the electronic document.

One primary advantage that computers offer over printed books as a means for presenting content to users is that computers have the potential to enhance the functionality of the rendered book. For example, computers have the potential to provide help functions for guiding or teaching a user about the computer and the electronic document being rendered. Similarly, computers have the potential to provide for access to settings controls for activating or deactivating additional features.

However, providing a user access to this functionality without interfering with the immersive reading experience presents a challenge. Moreover, many state-of-the-art viewing systems provide a single page or single-window viewing environment which complicates the task of providing help and settings control features and other functionality to users. Accordingly, it would be advantageous to provide a user interface which offers a user access to help features and settings controls and is usable in a single page or single window viewing environment, yet which maintains conditions that foster an immersive reading experience.

SUMMARY OF THE INVENTION

The present invention addresses the aforementioned problems by providing an apparatus and method for presenting integrated help features and settings controls in a single book-formatted electronic document. The single electronic document can be accessed easily by a user by selection of an appropriate control with a user selection device. Since the help and control settings are integrated into a single document, the user need not navigate through more than one document in order to access help features and control settings. Moreover, since the help and settings control document is book-formatted, navigation follows the familiar paradigm of a printed book, adding to the user's immersive reading experience and permitting access to help features and control settings in a single-page or single-window viewing environment.

The present invention also provides for automatic or "smart" navigation to the most logical part of the book-formatted help and settings control document based on predicted user needs at the time the help and settings control document is accessed. The target area or chapter of the help and settings control document is determined by monitoring a number of different criteria, including the context of the originating document from which the help settings document is invoked, user profiles, navigation history. The invention also contemplates a "learning" capability in order to determine if a predicted target area or chapter of the help and settings control document is actually the one that the user sought.

The invention is particularly applicable to user interface architectures such as those described commonly assigned U.S. patent application Ser. No. 09/456249, entitled "Computer User Interface Architecture Wherein Users Interact With Both Content And User Interface By Activating Links" and filed contemporaneously with this application. The subject matter of that application is incorporated herein by reference in its entirety.

BRIEF DESCRIPTION OF THE DRAWINGS

The present invention is illustrated by way of example in the accompanying Figures, which should not be construed as limiting, in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
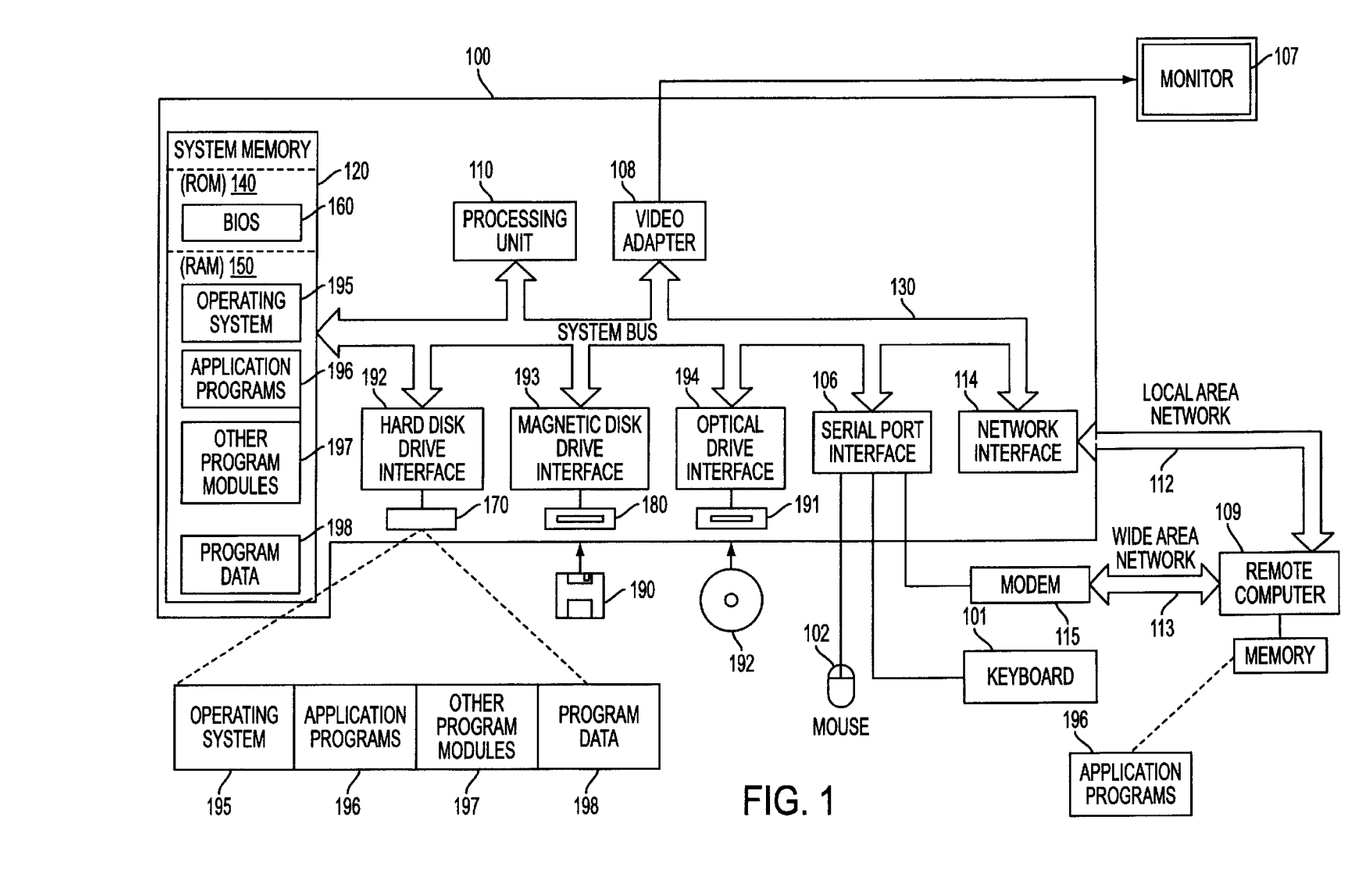
FIG. 1 is a schematic block diagram of a general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general purpose computing device in the form of a conventional personal computer 100, having a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150. A basic input/output system 160 (BIOS), containing the basic routines that helps to transfer information between elements within the personal computer 100, such as during start-up, is stored in ROM 140.

The personal computer 100 further includes a hard disk drive 170 for reading from and writing to a hard disk (not shown). Also included are a magnetic disk drive 180 for reading from or writing to a removable magnetic disk 180, and an optical disk drive 191 for reading from or writing to a removable optical disk 192 such as a CD-ROM or other optical media. The hard disk drive 170, magnetic disk drive 180, and optical disk drive 191 are connected to the system bus 130 by a hard disk drive interface 192, a magnetic disk drive interface 193, and an optical drive interface 194, respectively. The drives and their associated computer-readable media provide nonvolatile storage of computer readable instructions, data structures, program modules and other data for the personal computer 100. Although the exemplary environment described herein employs a hard disk 170, a removable magnetic disk 190 and a removable optical disk 192, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 190, optical disk 192, ROM 140 or RAM 150, including an operating system 195, one or more application programs 196, other program modules 197, and program data. 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor and speakers, personal computers typically include other peripheral output devices (not shown), such as printers.

The personal computer 100 may operate in a networked environment using logical connections to one or more remote computers, such as remote computer 109. Each remote computer 109 may be another personal computer, a server, a router, a network PC, a peer device or other common network node, and typically includes many or all of the elements described above relative to the personal computer 100, although only a memory storage device 150 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local area network 112 through a network interface or adapter 114. When used in a WAN networking environment, the personal computer 100 typically includes a modem 115 or other means for establishing communications over WAN 113. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
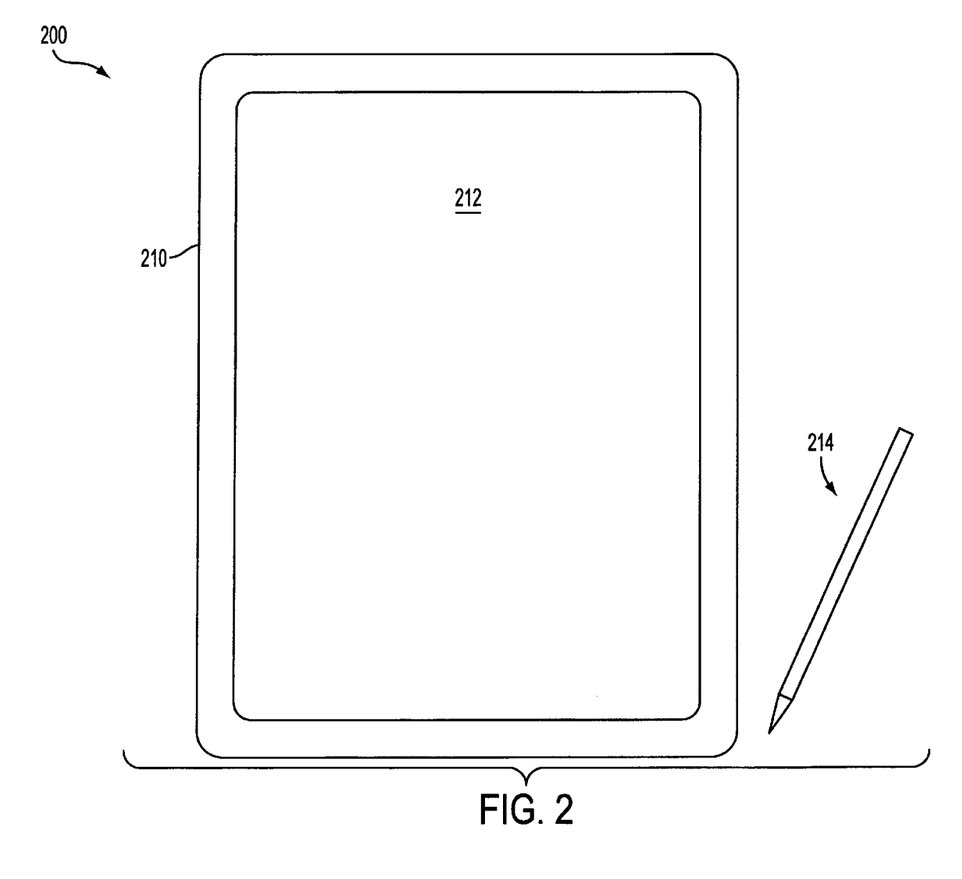
FIG. 2 illustrates an exemplary hand-held computer system that can be used in accordance with various aspects of the invention.

FIG. 2 illustrates a hand-held computer that can be used in accordance with various aspects of the invention. Any or all of the features, subsystems and functions of the system described with respect to FIG. 1 can be included in the hand-held computer of FIG. 2. Computer 200 includes a computer housing 210 and a display 212, for example a touch-sensitive flat panel Liquid Crystal Display (LCD). Using a selection device 214, such as a stylus, a user can select various areas of the display 212 in order to obtain access to various electronic books and help features and settings controls according to the invention as will be explained below.

Those of ordinary skill will understand that selection device 214 may include hard or soft buttons built in to the hand-held computer 200 for selecting particular associated functionality. Moreover, the selection device 214 may include a user's own finger used to select appropriate areas on the touch-sensitive display 212. Thus, the term "selection device" is intended to have a broad definition and encompasses many variations on well-known input devices.

Figure 3:
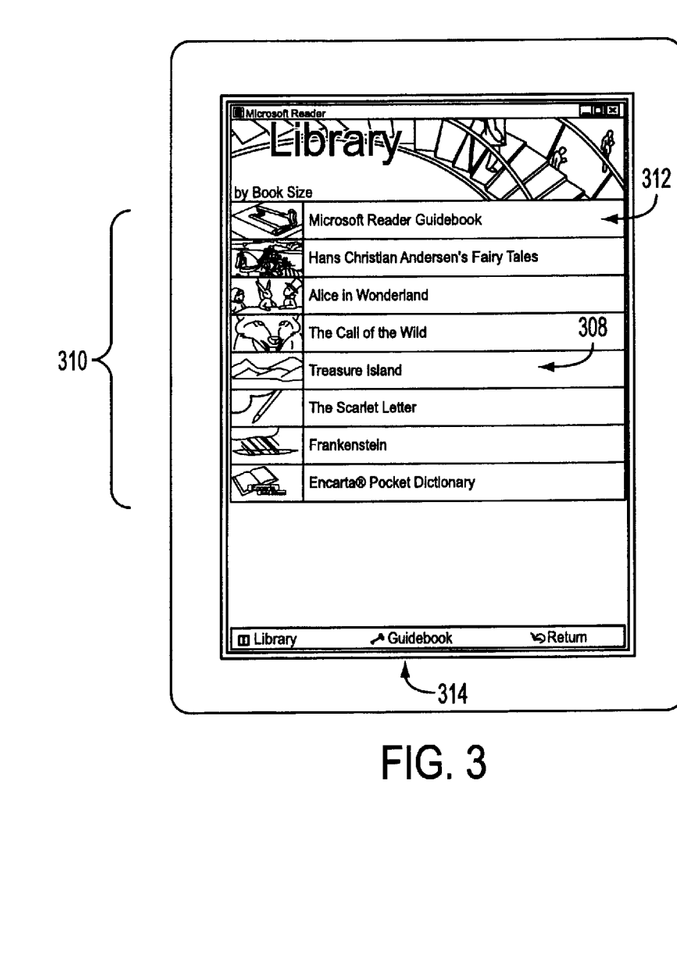
FIG. 3 illustrates an exemplary user interface for providing user access to a library of books or electronic documents.

FIG. 3 illustrates an exemplary user interface for selecting electronic documents from a library of documents displayed in a library page 308 displayed on display 212. A series of titles 310 is presented to the user and includes titles of classic novels, for example, as well as titles of other useful documents such as a dictionary. In accordance with the invention, a document entitled MICROSOFT READER GUIDEBOOK 312 is displayed and refers to a help and settings control document according to the invention.

Figure 4:
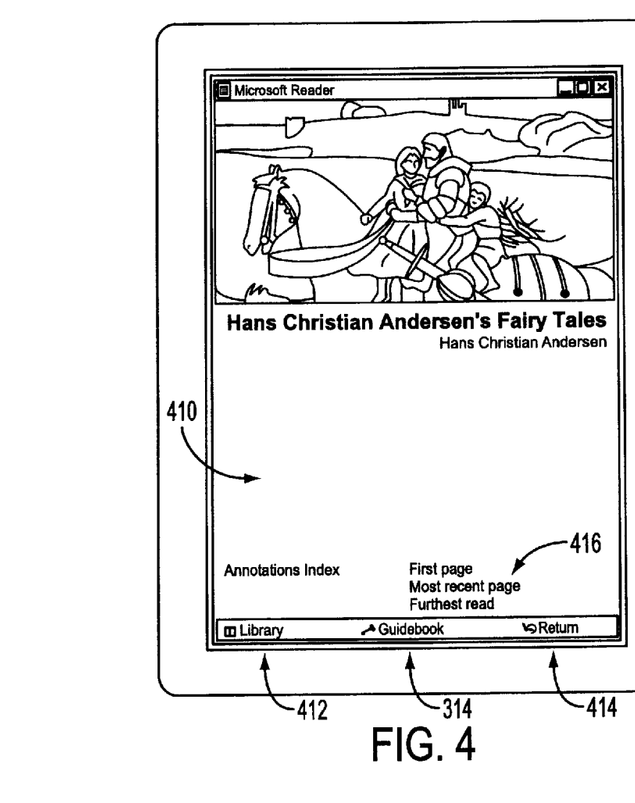
FIG. 4 illustrates an exemplary user interface including book title page having a control for accessing a help and settings control document according to the invention.

In accordance with the invention, a control 314, for example, an icon or button labeled GUIDEBOOK, for accessing the help and settings control document is displayed in a frame around the library page 308. By tapping with the user selection device, i.e., stylus, on the display 212 in a location corresponding a book title, for example, the title page for the corresponding book is displayed as shown in FIG. 4. As can be seen with reference to FIG. 4, a control 314 for accessing the help and settings control document will preferably remain on the display when a book is being read by a user in order to provide constant access to the help features and settings controls. Here, the title page 410 for one of the book titles displayed on library page 308 is displayed. Also provided on the display are a LIBRARY button 412 for accessing the library page 308, and a RETURN button 414 for returning to a previously displayed page. Also displayed on the title page 410 are a number of controls or links 416 for navigating within the selected book, for example, the FIRST PAGE link would take a user to the first page of the book and the MOST RECENT PAGE link would take a user to the most recently displayed page of the book from a previous reading session.

It will be recognized that navigation of the electronic documents occurs in a single-window or single page viewing environment that provides a single navigational focus. That is, only one page of a document can be displayed on display 212 at one time. This is consistent with the immersive reading environment that is an objective of state-of-the-art dedicated devices for reading electronic documents. As will become apparent from further reading of this disclosure, the present invention provides access to help features and settings controls in this single-window or single page environment. Thus, the invention may be accomplished in hand-held devices which permit only a single document context to be viewed at any one time, or in a desktop computer having a multiple-window operating environment which permits multiple windows to be viewed wherein a reading application—the application that provides for the immersive reading of electronic document—is associated with one of the windows.

Referring again to FIG. 3, a user may access the help and settings control document according to the invention by selecting either the title 312 of the document or the button 314 illustrated on the library page 308. When such a selection is made, a signal is generated by the touch-sensitive display 212 and, in a manner that will be explained in more detail below, the help and settings control document is displayed as illustrated in FIG. 5A.

Figure 5A:
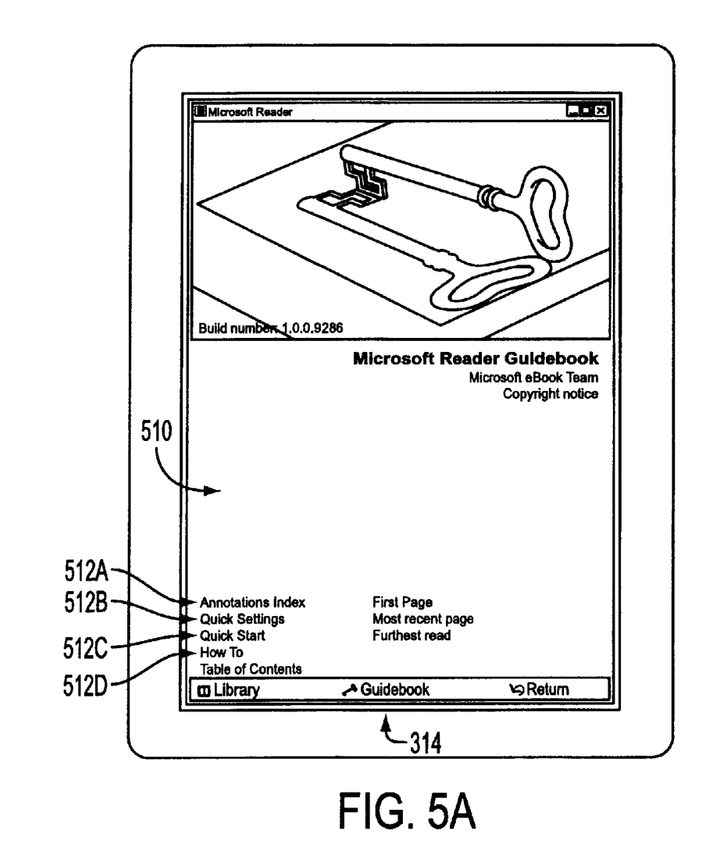
FIG. 5A illustrates an exemplary user interface including cover page for a help and settings control document according to the invention.

FIG. 5A illustrates a cover page 510 for an exemplary help and settings control document according to the invention. The cover page 510 provides an index of links 512 to a number of document parts, sections or chapters. For example, link 512A provides access to an annotations index, where a user may keep notes relating to the help and settings control document. Link 512B provides access to a settings control chapter of the document in accordance with the invention to enable a user to modify settings for the reading application and computer, as will be explained in more detail below. Link 512C provides access to a QUICK START chapter that provides rudimentary operating instructions to a user, for example. Link 512D provides access to help features in accordance with the invention. Thus, help features and settings controls may be accessed by a user as links to chapters or sections in a single help and settings control document.

Figure 5B:
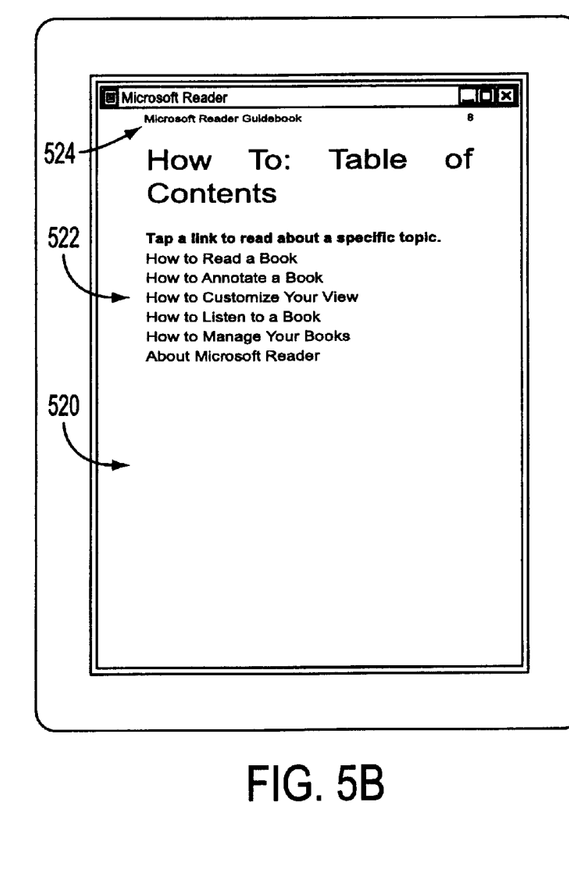
FIG. 5B illustrates an exemplary user interface for providing access to help features according to the invention.

Referring additionally to FIG. 5B, when a user activates or selects link 512D, a help feature listing page 520 is displayed, including a series of links 522 for accessing help descriptions on various topics. Each of these links may be selected by the user and in response to such selection, the user will be provided with instructions pertaining to the selected link. In accordance with the invention, navigational features are provided on the help feature listing page 520 as can be seen with reference to FIG. 5C. For example, the document title 524 appearing on the help feature listing page 520 may be selected to display a series 526 of navigational links enabling the user to navigate from the help feature listing page 520 to other parts, sections or chapters in the help and settings control document, to the library listing or to other documents.

Figure 5C:
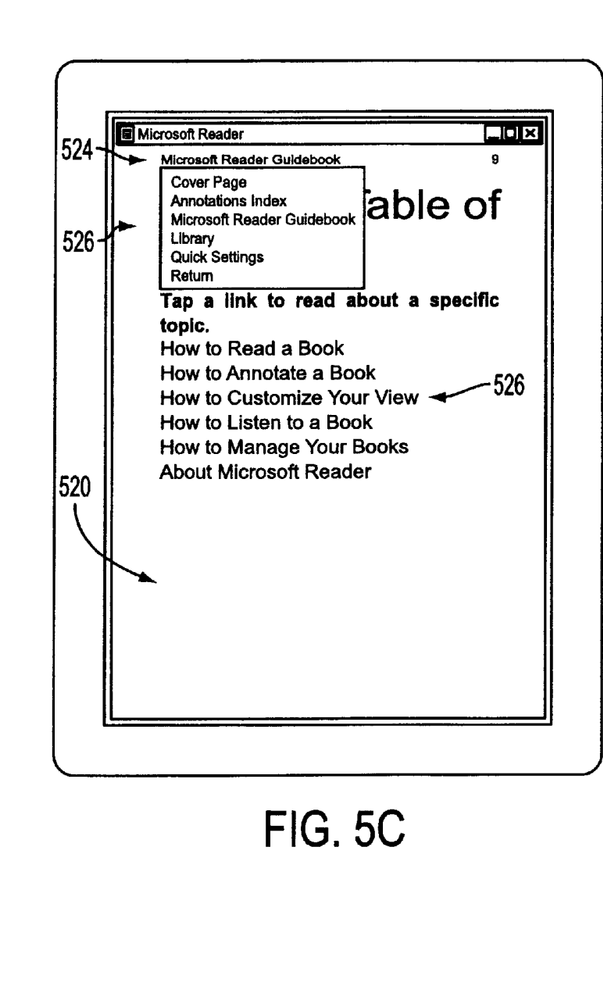
FIG. 5C illustrates an exemplary user interface for navigating from a help feature page according to the invention.
Figure 5D:
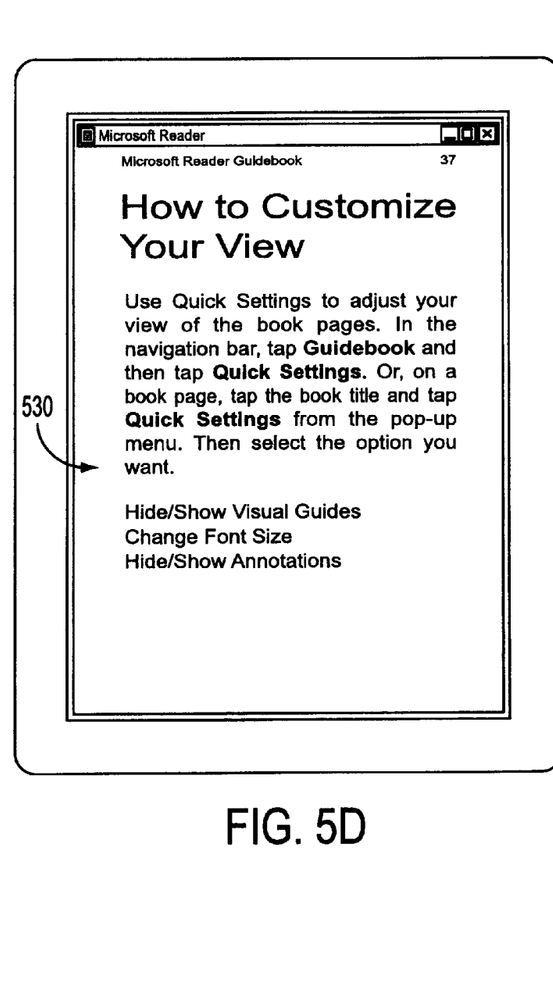
FIG. 5D illustrates an exemplary user interface for providing access to a settings control according to the invention.

FIG. 5D illustrates an exemplary help feature providing instructions to a user in response to activation of the link 526 in FIG. 5C. The exemplary instructional page 530 describes how a user may change certain settings or attributes affecting the reading experience. Although this page is used as an example to describe the help features of the help and settings control document of the invention, the page itself describes exemplary settings control features of the invention, as will be described below. For example, the link HIDE/SHOW VISUAL GUIDES may instruct a user as to enabling or disabling particular guide features as an aid to learning about the user interface. The link CHANGE FONT SIZE may be activated to obtain instructions for changing the font size. The link HIDE/SHOW ANNOTATIONS may be activated to obtain instructions for toggling the annotations display associated with a document.

Figure 5E:
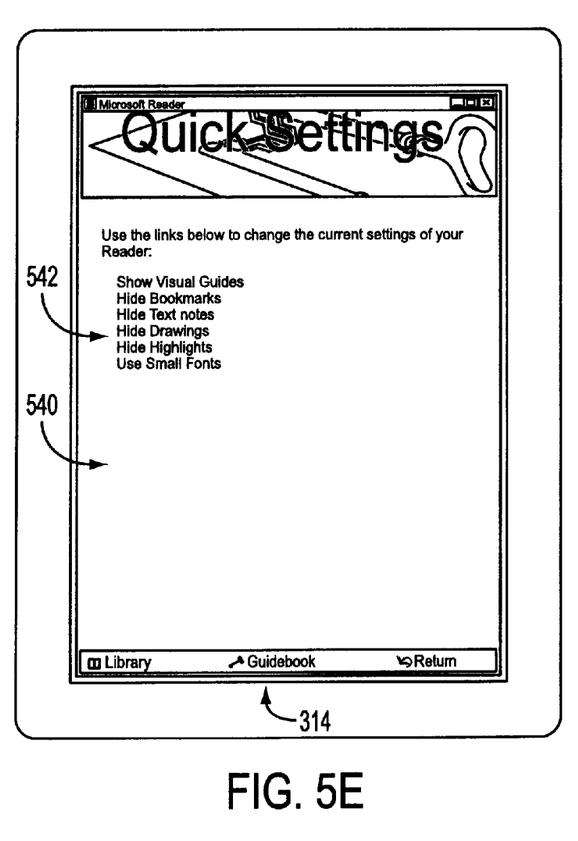
FIG. 5E illustrates an exemplary user interface for providing access to settings controls according to the invention.

FIG. 5E illustrates an exemplary settings control page 540 in accordance with the invention. The settings control page 540 includes a listing of descriptive settings controls 542. Although illustrated as descriptive words, the controls 542 may also be provided as icons or buttons. A user may change settings by tapping on the appropriate control 542. For example, if a user taps on the HIDE BOOKMARKS control, the reading application is reconfigured to hide bookmarks that the user may have made on particular pages of the documents being viewed. In response to the user tapping on the HIDE BOOKMARKS control, the settings control page 540 redisplays the control as SHOW BOOKMARKS, indicating that the settings control has been toggled. Preferably, the settings controls 542 are implemented as binary controls that can be toggled by the user quickly and without interfering with the immersive reading experience. Alternatively, the settings controls 542 may be provided as multi-choice controls, each having associated with it a list of options that is displayed in response to the control being tapped, in a manner similar to the list of options associated with the document title 524 shown in FIG. 5C.

In accordance with another aspect of the invention, a "smart" or "intelligent" navigational capability is provided for determining a target part of the help and settings control document that is sought by a user when the help and settings control document is invoked. The criteria for determining which part of the help and settings control document is being sought by a user may be based in part on monitoring the users current reading context, tracking the user's historical navigation of help and settings control document or other documents and information about the user's preferences stored for example, in a user profile.

Figure 6:
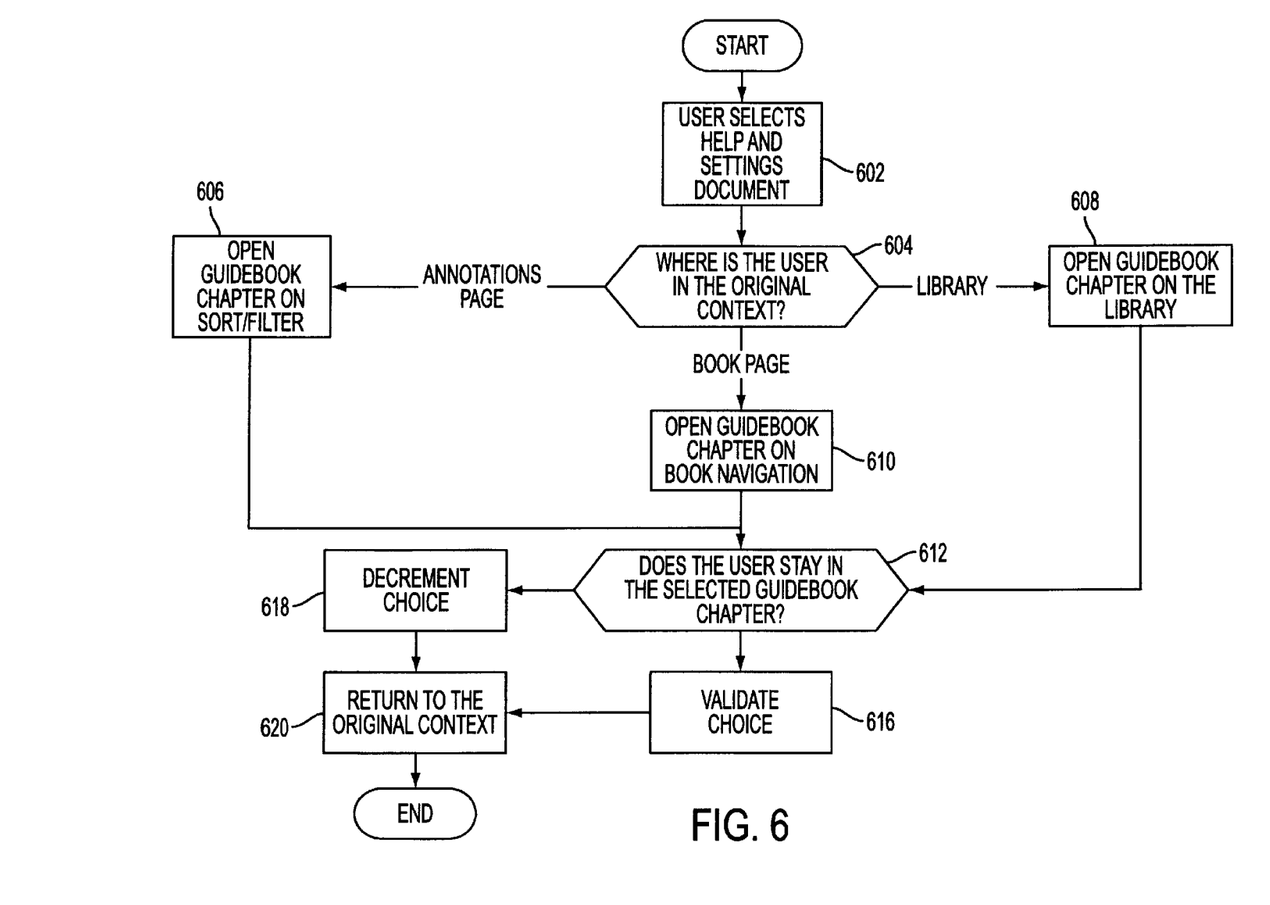
FIG. 6 is a flow diagram illustrating a method for smart navigation and learning according to the invention.

FIG. 6 illustrates a general flow diagram for an exemplary method for determining a target part or area of the help and settings control document based on the current reading context. In step 602, the user, while in an original context, i.e., the context from which the user invokes the help and settings control document, selects the help and settings document by activating an associated control displayed on the display 212 (FIG. 2). At step 604, a determination is made as to where the user is in the original context.

The determination at step 604 can be made by storing and updating in memory a pointer corresponding to the context that a user is in as the user navigates to different contexts. For example, when a user navigates to the library context, a first numerical value may be stored in a particular memory location. When the user navigates to another context, such as a page in a book being read, a second numerical value may be stored in the particular memory location. Likewise, when the user navigates to a third context, such as an annotations page for a book being read, a third numerical value may be stored in the particular memory location.

If it is determined that the original context is a library context, at step 604 the help and settings control document (guidebook) is opened at step 608 to the chapter describing the library help features. Alternatively, if it is determined at step 604 that the original context is an annotations page, the help and settings control document is opened at step 606 to a chapter describing annotations help features, such as sort and filter features for sorting and filtering annotations. As a further alternative, if at step 604 it is determined that the original context is a book page, the help and settings document is opened at step 610 to a chapter describing book navigation. The pointer stored in the memory location as described above may be used to determine which part, section or chapter of the help and settings document is to be the target. Steps 612-620 represent method steps for enabling the "smart" navigational system to determine the accuracy of the prediction of the target part, section or chapter of the help and settings control document. At step 612, a determination is made as to whether or not the user remains in the selected part, section or chapter of the help and settings control document or whether the user navigates to a different part, section or chapter. This determination can be made by monitoring the navigational history of the user within the help and settings control document. If at step 612 it is determined that the user does not remain in the selected or target part, section or chapter of the help and settings control document, at step 618 the choice is decremented to a different choice to be used to predict the target part, section or chapter the next time the help and settings control document is accessed. If on the other hand, at step 612 it is determined that the user remained in the selected or target part, section or chapter of the help and settings control document, at step 616 the choice is validated. Validation may involve a determination of how long the user remains in the help and settings control document. If a user returns from the help and settings control document quickly, it can be inferred that the prediction is correct. If, on the other hand, the user frequently navigates to other parts of the help and settings control document, it can be inferred that the user model relied upon is incorrect or inaccurate. At step 620, the display returns to the original context from which the help and settings control document was invoked and the process terminates.

Figure 7:
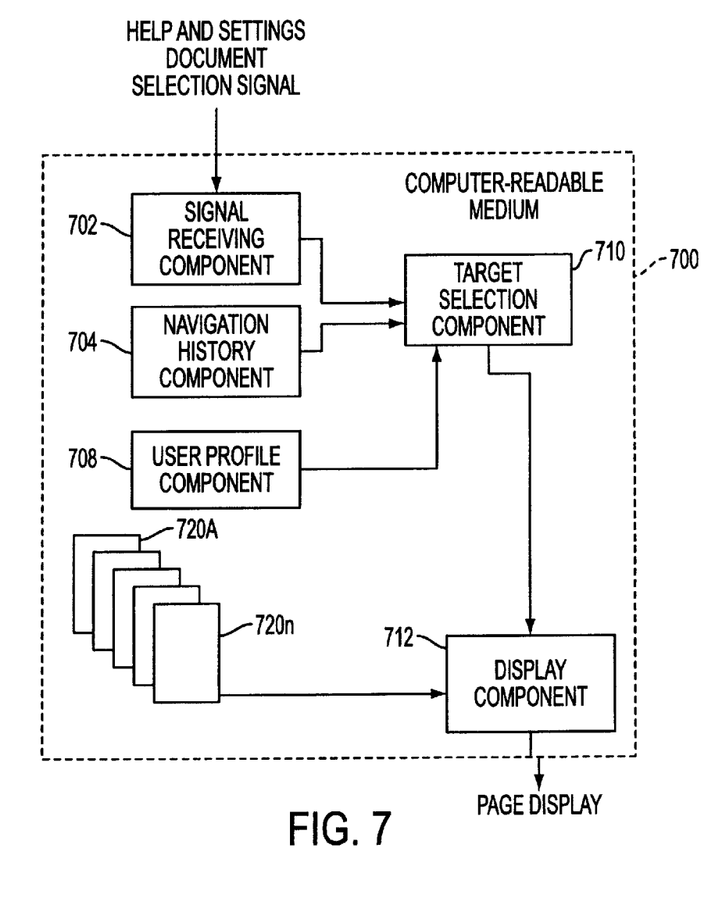
FIG. 7 is a schematic diagram illustrating the components of a user interface for help and settings control according to the invention.

FIG. 7 illustrates a block diagram of an exemplary system for implementing a help and settings control document according to the invention. A computer-readable medium 700, which may comprise a magnetic storage media or computer memory, contains the various components or modules defined by computer-executable instructions for accomplishing an exemplary system for providing access to a help and settings control document according to the invention. A help and settings document selection signal is generated, for example, by a user tapping a selected area of a touch sensitive display and is received by a signal receiving component 702. Signal receiving component 702 provides a signal to a target selection component 710, which functions to determine a part, section or chapter of the help and settings control document that is to be displayed. Target selection component 710 provides a signal to a display component 712 which retrieves the appropriate page of the help and settings control document 720 from memory and displays it on display 212 (FIG. 2). It will be understood by those of ordinary skill in the art that target selection component 710 selects the cover page 720A of the help and settings control document by default. However, according to the "smart" navigational aspects of the invention, target selection component 710 may be configured to select a particular part, section or chapter of help and settings control document 720, based on appropriate inputs from navigational history component 704 and user profile component 708.

Navigation history component 704 provides for the storage of information representing a user's navigation within and between documents. Navigational history component 704 may also include information representing the original context from which the help and settings document is accessed, as described above with reference to FIG. 6. User profile component 708 contains information representing user preferences, for example, or user experience levels with the particular reading application and with the help and settings control document.

As will be appreciated by those of ordinary skill, the invention contemplates "smart" navigational systems that utilize a series of presumed user models and that monitor user activity as a user accesses a help and settings control document. Essentially, the goal is to predict what the user thinks when they resort to the help and settings control document. The invention contemplates the identification of discrete user models that users form as they work with the system. The invention also contemplates determining which user models are inaccurate, and inferring which user models have been adopted by a user based on the actions the user takes when navigating within the help and settings control document. For example, a presumed user model might predict that users are likely to have trouble understanding the function and content of different types of pages in an electronic book. Thus, according to the invention, the system would automatically navigate to a part of the help and settings control document that contains explanations of page types. On the other hand, if a user consistently searches for explanations of navigational methods after the system automatically navigates to the page explanation part of the help and control settings document, the system will infer that the difficulties a specific user is having are more related to navigation that context. Those of ordinary skill in the art will recognize that the development of systems according to the invention may involve studies of user interaction with the system to formulate accurate user models.

Although an exemplary process and apparatus according to the invention have been described above, it should be appreciated that a variety of modifications will be readily available to persons utilizing the invention. The foregoing description is not intended to be limiting, but is merely illustrative of an exemplary adaptation of the invention. Other products, apparatus and methods that incorporate modifications or changes to that which has been described herein are equally included within this application.

What is claimed is:

1. In a computer system having a user interface including a display, a method of displaying a help and settings control document on the display, the method comprising the steps of:

displaying a first document context on the display within a single navigational focus;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a navigational history associated with the user.

2. In a computer system having a user interface including a display, a method of displaying a help and settings control document on the display, the method comprising the steps of:

displaying a first document context on the display within a single navigational focus;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a profile associated with the user.

3. In a computer system having a user interface including a display, a method of displaying a help and settings control document on the display, the method comprising the steps of:

displaying a first document context on the display within a single navigational focus;

receiving a signal corresponding to a user request for the help and settings control document;

in response to the signal, determining a target part of the help and settings control document that is sought by a user;

displaying the target part of the help and settings control document within the single navigational focus; and determining the accuracy of the target part determination.

4. The method of claim 3, wherein the step of determining the accuracy further comprises the step of determining whether a user navigates to a part of the help and settings document that is different from the target part.

5. A computer-readable medium having stored thereon computer-executable instructions for performing a method of providing a user access to help and settings controls, the method comprising the steps of:

displaying a first document context within a single navigational focus on a display;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a navigational history associated with the user.

6. A computer-readable medium having stored thereon computer-executable instructions for performing a method of providing a user access to help and settings controls, the method comprising the steps of:

displaying a first document context within a single navigational focus on a display;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a profile associated with the user.

7. A computer-readable medium having stored thereon computer-executable instructions for performing a method of providing a user access to help and settings controls, the method comprising the steps of:

displaying a first document context within a single navigational focus on a display;

receiving a signal corresponding to a user request for the help and settings control document;

in response to the signal, determining a target part of the help and settings control document that is sought by a user;

displaying the target part of the help and settings control document within the single navigational focus; and determining the accuracy of the target part determination.

8. The computer-readable medium of claim 7, wherein the step of determining the accuracy further comprises the step of determining whether a user navigates to a part of the help and settings document that is different from the target part.

9. An apparatus comprising:

a processor;

a display coupled to the processor;

a user interface selection device coupled to the processor; and a storage device, coupled to the processor, comprising instructions, executable by the processor, for performing steps of:

displaying a first document context on the display within a single navigational focus;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a navigational history associated with the user.

10. An apparatus comprising:

a processor;

a display coupled to the processor;

a user interface selection device coupled to the processor; and a storage device, coupled to the processor, comprising instructions, executable by the processor, for performing steps of:

displaying a first document context on the display within a single navigational focus;

receiving a signal corresponding to a user request for the help and settings control document;

in response to the signal, determining a target part of the help and settings control document that is sought by a user; and displaying the target part of the help and settings control document within the single navigational focus, wherein the step of determining the target part of the help and settings control document further comprises the step of determining the target part based on a profile associated with the user.

11. An apparatus comprising:

a processor;

a display coupled to the processor;

a user interface selection device coupled to the processor; and a storage device, coupled to the processor, comprising instructions, executable by the processor, for performing steps of:

displaying a first document context on the display within a single navigational focus;

receiving a signal corresponding to a user request for the help and settings control document;

in response to the signal, determining a target part of the help and settings control document that is sought by a user;

displaying the target part of the help and settings control document within the single navigational focus; and determining the accuracy of the target part determination.

12. The apparatus of claim 11, wherein the step of determining the accuracy further comprises the step of determining whether a user navigates to a part of the help and settings document that is different from the target part.

13. The apparatus of claim 9, wherein the step of determining the accuracy of the target part determination.

14. The apparatus of claim 13, wherein the step of determining the accuracy further comprises the step of determining whether a user navigates to a part of the help and settings document that is different from the target part.

* * * * *